(12) United States Patent
Itoh et al.

(10) Patent No.: US 7,126,736 B2
(45) Date of Patent: Oct. 24, 2006

(54) ILLUMINATION DEVICE, DISPLAY DEVICE AND PROJECTOR

(75) Inventors: Yoshitaka Itoh, Matsumoto (JP); Hideki Kojima, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/131,299

(22) Filed: May 18, 2005

(65) Prior Publication Data

US 2005/0259308 A1    Nov. 24, 2005

(30) Foreign Application Priority Data

May 19, 2004    (JP) .............................. 2004-149185

(51) Int. Cl.
*G02B 26/08*    (2006.01)
(52) U.S. Cl. ...................... 359/212; 362/241
(58) Field of Classification Search ................ 362/345, 362/239, 241, 245; 359/196–205, 211–226, 359/554–559
See application file for complete search history.

(56) References Cited

U.S. PATENT DOCUMENTS 5,335,044 A * 8/1994 Shiraishi ...................... 355/53

2003/0081178 A1 * 5/2003 Shimizu et al. ............... 353/20

FOREIGN PATENT DOCUMENTS

| JP | A 2001-296841 | 10/2001 |
| JP | A 2004-004463 | 1/2004 |
| JP | A 2004-004618 | 1/2004 |

OTHER PUBLICATIONS

Kurita; "Display System of Hold Type Display and Picture Quality Upon Displaying Motion Picture"; Drafts of The 1st LCD Forum; Liquid Crystal Society, pp. 1-6; Aug. 1998 with English translation.

* cited by examiner

*Primary Examiner*—Euncha P. Cherry
(74) *Attorney, Agent, or Firm*—Oliff & Berridge, PLC

(57) ABSTRACT

A projector capable of displaying a moving picture image in good quality with a clear outline and few blurs includes a light source, a pseudo rectangular light flux generating device to generate a band-shaped illumination light flux from a light flux emitted from the light source, and an optically scanning device to scan with the illumination light flux emitted from the pseudo rectangular light flux generating device on an optically modulating apparatus. The projector further includes an illumination light flux shaping device to shape the illumination light flux into a desired shape of illumination light flux, the illumination light flux shaping device being in an optical path of the illumination light flux emitted from the pseudo rectangular light flux generating device.

12 Claims, 8 Drawing Sheets

ILLUMINATION DEVICE, DISPLAY DEVICE AND PROJECTOR

BACKGROUND

The exemplary embodiments relate to a display device and a projector (a projecting type of display device), which have a holding type of display mode and in which an image is formed by an optically modulating device, and an illumination device suitable for use in the display devices.

A related art holding type of optically modulating device, such as a liquid crystal panel, a liquid crystal light valve, a micro mirror array (DMD) and the like, controls a transmitted light amount or a reflected light amount per a unit of time to carry out optical strength modulation. In this type of device, the image is unclear in displaying a moving picture image. Especially in an edge part, the unclearness can be perceived to be a "blur." KURITA TAIICHIRO, Display Method and Picture Quality in Displaying Moving Picture in Holding Type of Display, "Drafts of First LCD Forum" Liquid Crystal Society, August 1998, Pages 1 to 6 discloses investigations for addressing or solving the above problem, for example.

In order to enhance or improve quality of a moving picture in a liquid crystal display device, which is a holding type of display device, for example, the following options are considered to be effective.

(1) Enhancing or improving a liquid crystal material or contriving a driving circuit to enhance or improve a response speed of a display device; and (2) turning on an illumination device intermittently to achieve an impulse type of display mode.

At the moment, enhancement or improvement in quality of a moving picture in a liquid crystal device is progressing with respect to the enhancement or improvement of a liquid crystal material or contrivance of a driving circuit (option (1)). Such an approach, however, is not enough and enhancement or improvement of an illumination device or an illuminating method (option (2)) should also be examined. A discharge lamp widely used for a light source of a direct-viewing type of display device or a projecting type of display device (a projector) is not suitable for lighting a lamp intermittently. Accordingly, an optical system in which some device to control illumination light is provided in a path of illumination light to achieve intermittent illumination. In JP-A-2001-296841, for example, an illumination optical system is proposed in which illumination light in a narrow and long band shape (an illumination band) is generated in advance by way of an integrator optical system, and then, a mirror in the shape of a square pillar is rotated to scan with the band-shaped illumination light, and thereby, intermittently illuminate (scan-illuminate) a liquid crystal display device.

SUMMARY

In order to display a clear moving picture image with few "blurs" in the above-mentioned illumination optical system, it is required to form a narrow and long illumination band, which is narrower in the scanning direction than an illumination target. Methods of forming an illumination band in typical two kinds of integrator optical systems are generally as follows. In a lens array type of integrator optical system in which two lens arrays are used, the shape of a rectangular lens forming a first lens array is arranged to be similar to the shape of the illumination band to be formed. On the other hand, in a rod lens type of integrator optical system in which a bar-shaped light guide having a total internal reflection surface or a tube-shaped light guide having a reflection surface is used, the shape of an emitting end surface of the light guide is arranged to be similar to the shape of the illumination band to be formed. The illumination band having a desired shape can be thus formed.

In the case that a narrow and long illumination band whose band width is narrow in the scanning direction is formed, however, a rectangular lens cannot converge light sufficiently in a lens array type of integrator optical system since light radiated from the light source, which is limited in length, cannot be completely parallel light. This causes the light flux to spread in a direction of a shorter side of the illumination band (which corresponds to a scanning direction of the illumination band), and thereby, an illumination band having a desired dimension or shape is not obtained. That is, it is necessary to form respective rectangular lenses $21a$ of a first lens array 21, as shown in FIG. 9, narrow and long for the purpose of obtaining the above-mentioned illumination band. However, narrowing a width in the y-axis direction causes a partial light flux emitted from the rectangular lenses $21a$ to be incident not only on corresponding transmission lenses $22a$ of a second lens array 22, but also on upper and lower adjacent transmission lenses $22b1$ and $22b2$. The light fluxes having passed through the upper and lower transmission lenses $22b1$ and $22b2$ go to a superimposing location at an angle different from that of the light flux having passed through the transmission lens $21a$. Therefore, as shown in FIG. 10, there is a difference in the y-axis direction at the superimposing location between the light flux having passed through the original transmission lens $22a$ and the light fluxes having passed through the upper and lower adjacent transmission lenses $22b1$ and $22b2$, so that the light fluxes are not superimposed at one point. As a result, the shape of the illumination band 85 spreads in a direction of a narrow width of the rectangular lens $21a$ on the illumination target 80 (refer to FIGS. 11A and 11B). Namely, such an optical system has a limitation for narrowing in width of the illumination band. Accordingly, narrowing the band width causes the edge part of the band to be blurred and spread, so that a desired narrow illumination band cannot be obtained.

On the other hand, in the case of the rod lens type of integrator optical system, incident efficiency from a light source to a rod lens significantly deteriorates or an emission angle from the emitting end surface becomes very large, so that a light converging device having a large aperture should be provided after the above. This causes a problem that an illumination band of a desired dimension cannot be obtained with high efficiency.

When such an illumination band is used to scan an area which should not be illuminated at a certain time, the illumination band also is exposed to illumination light. Therefore, a ratio of "an illuminated area" to "a whole area of the illumination target" cannot be decreased, so that an effect as an intermittent illumination is reduced. Accordingly, an expected improving effect cannot be achieved, although an extremely narrow and long illumination band is used for further improving quality of a moving picture image.

The exemplary embodiments address or solve the above problems. An object of the exemplary embodiments is to provide a display device and a projector (a projecting type of display device), which are capable of displaying a moving picture image with a clear outline, few blurs and high quality. Another object of the exemplary embodiment is to provide an illumination device suitable for use in the display devices.

In order to address or solve the above problems, an illumination device in accordance with the exemplary embodiments is an illumination device to location-selectively scan and radiate an illumination light flux formed into the shape of a band on an optically modulating apparatus, the optically modulating apparatus having a holding type of display mode synchronously with a writing operation of the optical modulating apparatus. The illumination device includes a light source; a pseudo rectangular light flux generating device to generate a band-shaped illumination light flux from the light flux emitted from the light source, the band-shaped illumination light flux defining an optical path; and an optically scanning device to scan the illumination light flux emitted from the pseudo rectangular light flux generating device on the optically modulating apparatus, and an illumination light flux shaping device, disposed in the optical path, to shape the illumination light flux into a desired shape.

In the illumination device according to the exemplary embodiments, the pseudo rectangular light flux generating device is first used to generate a narrow and long band-shaped first illumination light flux, the illumination light flux shaping device is then used to shield an unnecessarily spread light flux (an outer circumferential part of the first illumination light flux, which is perceived as a blur of an edge part) to finally generate the second illumination light flux in a desired band shape. Accordingly, it is possible to obtain a narrow and long illumination light flux having a clear outline. This allows a clear display with few "blurs" to be achieved even in the case of displaying a high-speed moving picture image, for example.

A shielding plate having a slit-shaped opening may be used for the illumination light flux shaping device. In this case, the shape of the opening of the shielding plate may be substantially similar to the shape of the illumination light flux moved to scan on the optically modulating apparatus, which is an illumination target.

Further, in the above structure, the shape of the opening of the shielding plate may be a shape capable of generating an illumination light flux in which a product of a width of the illumination light flux in the scanning direction and the luminance in the light flux is substantially uniform in a direction orthogonal with the scanning direction. In the structure, the shape of the opening of the shielding plate is determined so that the brightness in a direction orthogonal to the scanning direction would be uniform, on condition that the first illumination light flux once formed on the illumination light flux shaping device has a distribution of luminance within a cross section of the light flux. In the structure, the light amount integrated in the scanning direction is uniform in the direction orthogonal to the scanning direction, so that a display without unevenness in luminance can be achieved.

In the above structures, a reflecting surface to reflect incident light toward a light source side is preferably formed in an area other than the opening of the shielding plate. Returning the shielded light to the light source side for recycling as described above allows efficiency in using light to be improved.

In the illumination device according to the exemplary embodiments, it may be arranged that the shielding plate be provided on an incident side of the optically scanning device and the illumination light flux shaped by the shielding plate be moved for scanning by the optically scanning device. In such a structure, the opening of the shielding plate can be fixed at a location to generate the first illumination light flux by the pseudo rectangular light flux generating device. This allows the structure to be simplified, and thereby, the device to be miniaturized. Further, in the structure, the second illumination light flux shaped by the illumination light flux shaping device is led to the illumination target by the optical system after the optically scanning device. Accordingly, only one illumination light flux shaping device is required even when the illumination device, according to the exemplary embodiments, is applied to a projector including plural optically modulating apparatuses.

Moreover, in the illumination device according to the exemplary embodiment, it may be arranged that the shielding plate be provided on an emission side of the optically scanning device and the illumination light flux moved to scan by the optically scanning device be shaped by the shielding plate. Such a structure becomes complicated since a mechanism for driving the shielding plate (that is, a mechanism for moving the opening of the shielding plate in accordance with the scanning position of the illumination light flux) is required. The illumination light flux, however, can be certainly shaped into a desired shape since the shielding plate is provided in the vicinity of the optically modulating apparatus. This allows a clear display with fewer "blurs" to be achieved. In such a projector, a rotating type of shielding plate for rotating synchronously with scanning of the illumination light flux may be used as the shielding plate. Further, it is possible to use as the above shielding plate a shielding plate in which the opening slides vertically and parallel in accordance with the scanning of the optically scanning device. The rotating shielding plate is, however, more preferable from a viewpoint that the driving mechanism is relatively simple, and thereby, the device can be easily miniaturized.

In addition, in the illumination device according to the exemplary embodiments, the optically scanning device may include a rotating prism for changing a location of an optical path by rotation to scan with light. In such a structure, scanning with the illumination light is performed in one direction on the illumination target so as to correspond to one-directional rotation of the rotating prism. The speed of the scanning light is easily controlled in accordance with the rotation speed of the rotating prism. Therefore, in accordance with the structure, the illumination light flux emitted from the pseudo rectangular light flux generating device or the illumination light flux shaping device can be radiated on the optically modulating apparatus without any loss. Furthermore, it is possible to obtain distribution of luminance more uniform than the case of a method of scanning reflection light by swinging a mirror right and left such as a case of using a galvano-mirror, for example.

A display device according to the exemplary embodiments includes the above-mentioned illumination device and an optically modulating apparatus having a holding type of display mode for modulating an illumination light flux emitted from the illumination device. A projector according to the exemplary embodiments includes the above-mentioned illumination device; an optically modulating apparatus having a holding type of display mode for modulating an illumination light flux emitted from the illumination device; and a projecting device to project light modulated by the optically modulating apparatus. In accordance with the above structures, it is possible to display a clear moving picture image with fewer "blurs".

BRIEF DESCRIPTION OF THE DRAWINGS

FIG. 2A illustrates a structure of an illumination light flux shaping device in an exemplary embodiment, and FIG. 2B illustrates a shape of an illumination band for an optically modulating apparatus;

FIG. 3A illustrates a shape of the second illumination band for an optically modulating apparatus, and FIG. 3B illustrates distribution of optical strength along a cross section AB in FIG. 3A;

FIG. 4A illustrates a case that a rotating phase of a rotating prism is at 0°, FIG. 4B illustrates a case that the rotating phase is from 0° to 45°, FIG. 4C illustrates a case that the rotating phase is from 45° to 90°, and FIG. 4D illustrates a case that the rotating phase is at 90°;

FIG. 5A illustrates a structure of the illumination light flux shaping device, FIG. 5B illustrates a shape of an illumination band for an optically modulating apparatus, and FIG. 5C illustrates distribution of luminance in an illumination band;

FIG. 6A illustrates a structure of the illumination light flux shaping device, and FIG. 6B illustrates a shape of an illumination band for an optically modulating apparatus;

FIG. 11A illustrates a shape of a second illumination band for an optically modulating apparatus, and FIG. 11B illustrates distribution of optical strength along a cross section AB of FIG. 11A.

DETAILED DESCRIPTION OF EMBODIMENTS

Exemplary embodiments will be described hereinafter. In all the drawings mentioned below, a thickness and a ratio in dimension of respective components and the like are not drawn to scale to more effectively illustrate the features therein.

First Exemplary Embodiment

A first exemplary embodiment of the invention will be first described with reference to FIGS. 1 to 4.

Figure 1:
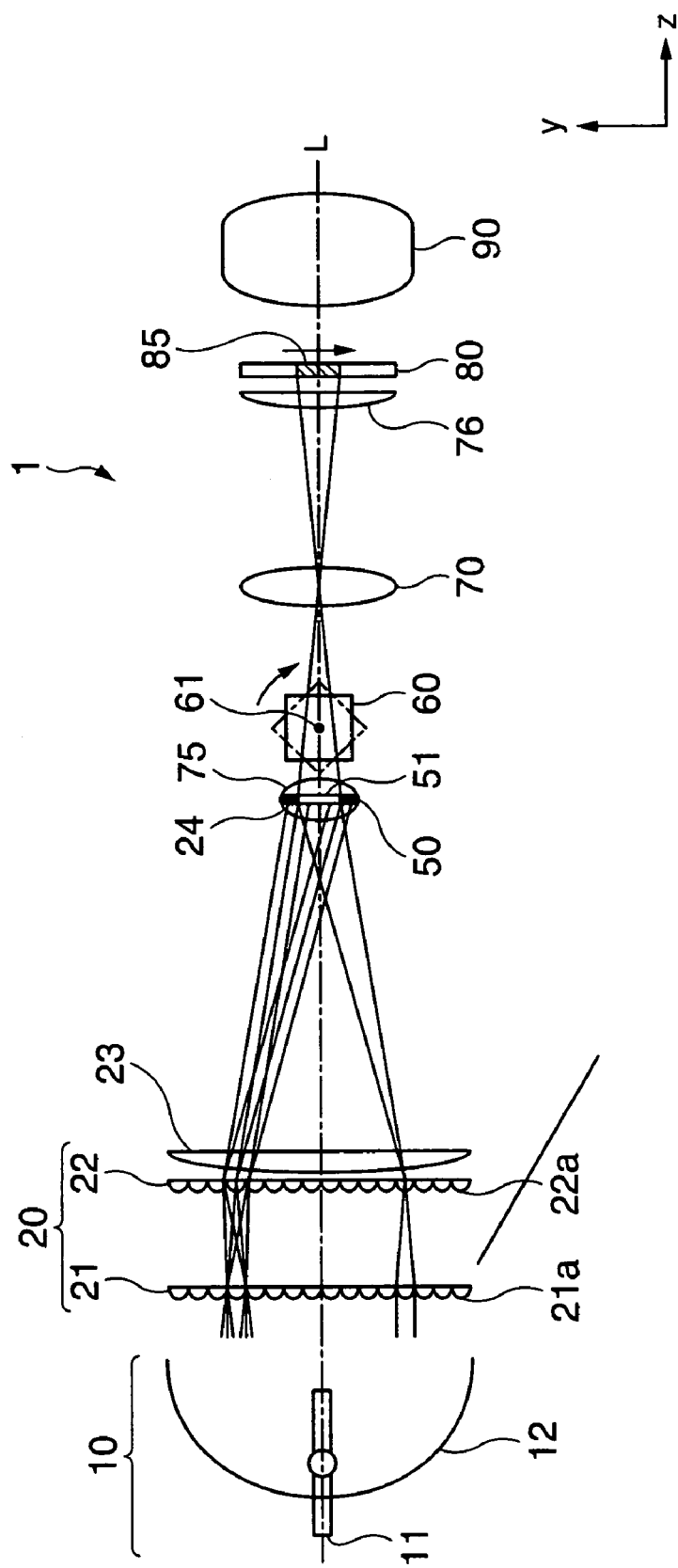
FIG. 1 is a schematic view of a projector in a first exemplary embodiment.

FIG. 1 is a schematic view of a structure of a projector 1 in Exemplary Embodiment 1. The projector includes, in its schematic structure, a light source 10, a pseudo rectangular light flux generating device 20 to generate an illumination light flux in a narrow and long band shape (an illumination band) from a light flux emitted from the light source 10, an illumination light flux shaping device 50 to shape the illumination band (a first illumination light flux) emitted from the pseudo rectangular light flux generating device 20, an optically scanning device 60 to move the shaped illumination band (a second illumination light flux) to scan on an illumination target (an optically modulating apparatus 80), the optically modulating apparatus 80 to modulate the light flux emitted from the optically scanning device 60 and a projecting lens (projecting device) 90 to project the modulated light.

The light source 10 including a light source lamp 11 to radially emit a light beam and a reflector 12 to emit the light beam, which is radiated from the light source lamp 11, in one direction (a z-axis direction in FIG. 1). A high pressure mercury lamp, a metal halide lamp, a halogen lamp, a xenon lamp or the like can be used as the light source lamp 11 while a paraboloidal reflector, an elliptical-surface reflector, a spherical surface reflector or the like can be used as the reflector 12.

The pseudo rectangular light flux generating device 20 includes a first lens array (a light flux dividing device) 21 as an integrator optical system, a second lens array (a converging optical device) 22, a superimposing lens (a superimposing device) 23 and the like. As described later, since a liquid crystal light valve is used as the optically modulating apparatus 80 in Exemplary Embodiment 1, it is possible to provide a polarization converting optical system on an emitting side of the second lens array, the polarization converting optical system including, as needed, a polarization beam splitter array (a polarization splitting device) to spatially split two kinds of polarization light fluxes included in the incident light (an S polarization light flux and a P polarization light flux), a retardation plate array (a polarization converting device) to convert one split polarization light flux into the other polarization light flux, and the like.

The lens arrays 21 and 22 include plural rectangular unit lenses 21a and 22a, respectively. The unit lenses 21a of the first lens array 21 correspond to the unit lenses 22a of the second lens array 22, respectively. A partial light flux divided by the respective unit lenses 21a of the first lens array 21 is arranged to be converged on the corresponding unit lens 22a of the second lens array 22. By the pseudo rectangular light flux generating device 20, an illumination band 85, longer in an x-axis direction (narrower in width in a y-axis direction) than the optically modulating apparatus 80, is formed, which is a target of illumination. Accordingly, the first lens array 21 includes rectangular lenses 21a, which are in a substantially similar shape to that of the illumination band 85 and also long in the x-axis direction. A function of the second lens array 22 is to transmit the partial light flux formed by the first lens array 21 to a superimposing location. Therefore, it is possible to use the transmission lenses 22a having the same shape as that of the lenses of the first lens array 21, although the shape of the transmission lenses (unit lenses) 22a forming the second lens array 22 is not limited. A plurality of partial light fluxes divided by the first lens array 21 are superimposed in substantially one place by the superimposing lens 23 to be one narrow and long first illumination band (a first illumination light flux).

Figure 9:
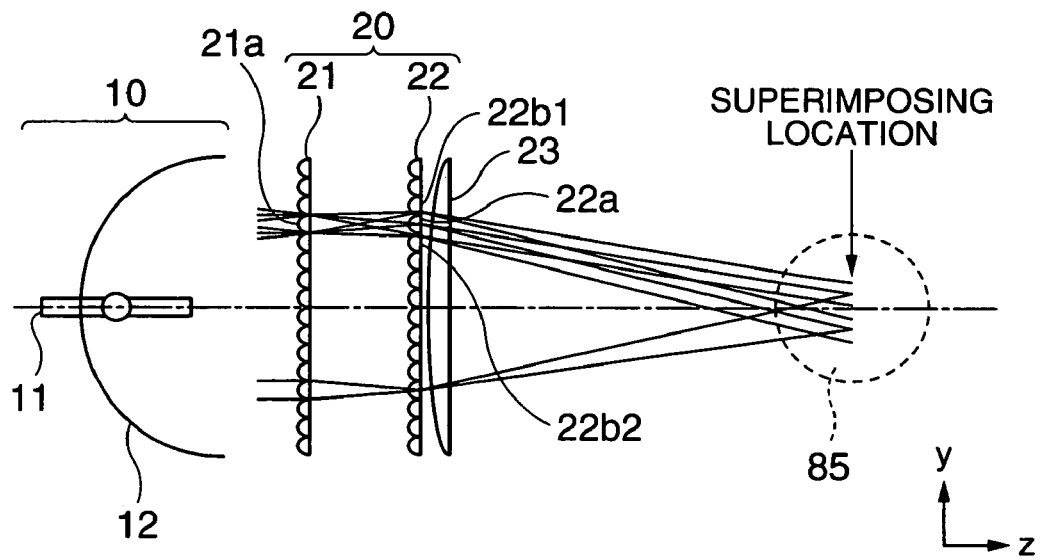
FIG. 9 is a schematic of transmission of a partial light flux in the case that a related art projector is used for forming a narrow and long illumination band.
Figure 10:
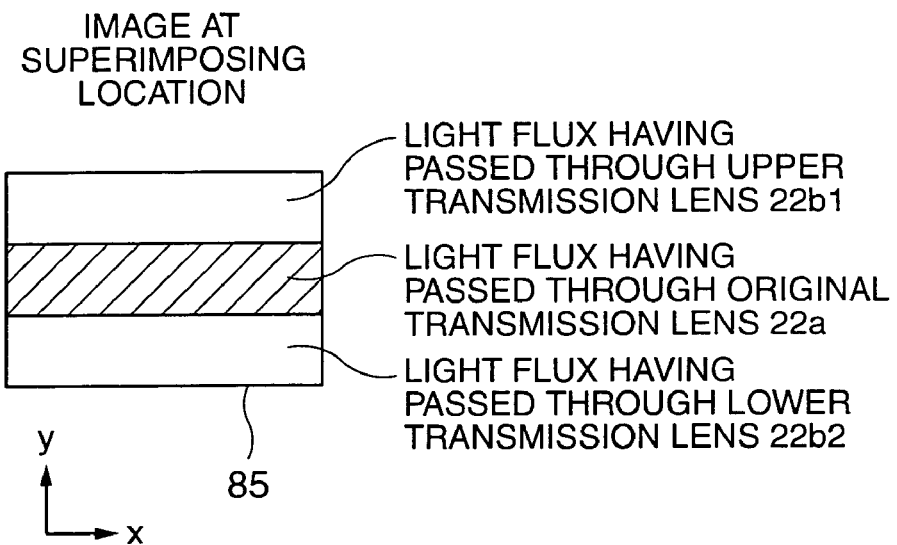
FIG. 10 is a schematic of superimposed partial light fluxes.
Figure 11A:
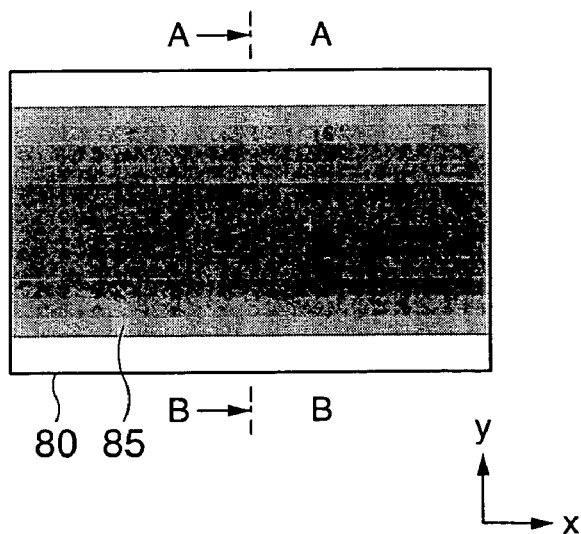
FIGS. 11A and 11B are schematics of a shape and distribution of luminance of an illumination band in a related art projector.
Figure 11B:
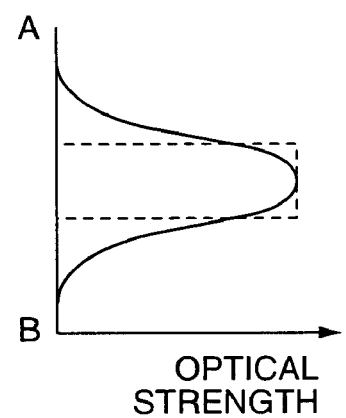

The partial light flux generated by the rectangular lens 21a is ideally transmitted to the superimposing location by the corresponding transmission lens 22a to form an illumination band having an outline similar to that of the rectangular lens 21a. As described in FIGS. 9 to 11, however, in the case that the rectangular lenses 21a are in a narrow and long shape, the partial light flux cannot be sufficiently converged in a direction of a narrow width of the rectangular lenses 21a (the y-axis direction in FIG. 1). This causes some partial light fluxes to be transmitted to the superimposing location via a transmission lens different from the original transmission lens (that is, another transmission lens adjacent in the y-axis direction). As a result, complete superimposing of the partial light fluxes cannot be achieved on the optically scanning device 60, so that the illumination band would spread in the y-axis direction as shown in FIG. 11. When the width of the illumination band (in the scanning direction of the optically scanning device 60) is unnecessarily widened, an effect as the intermittent illumination is decreased. Accordingly, in Exemplary Embodiment 1, in order to generate the second illumination band (the second illumination light flux) having a desired width in the y-axis direction from the first illumination band spreading in the y-axis direction (refer to FIG. 11), the illumination light flux shaping device 50 is provided at or in the vicinity of the superimposing location of the partial light fluxes. The partial light flux is desirably arranged to be superimposed in the optically scanning device 60 for the purpose of scanning the illumination band with good precision with the optically scanning device 60. Therefore, when regarding the scanning precision of the illumination band as important, the illumination light flux shaping device 50 may be provided slightly nearer to the light source 10 than the location where the partial light fluxes are superimposed.

Figure 2A:
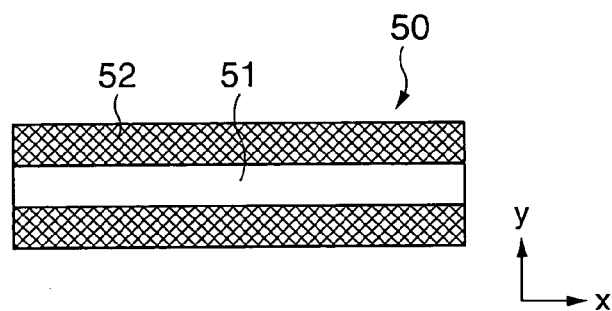
FIGS. 2A and 2B are schematics of a structure and an operation of an illumination light flux shaping device in an exemplary embodiment.

The illumination light flux shaping device 50 is a kind of shielding plate having a slit-shaped opening 51, as shown in FIG. 2A. The illumination light flux shaping device 50 is for shielding the light incident on an area other than the opening 51 (the shielding part 52). The opening 51 may be a physical opening or may be optically translucent. The shielding part 52 may be an optical absorption surface for absorbing unnecessary light or a reflecting surface to reflect the unnecessary light to a light source 10 side. In the case of the reflecting surface, the unnecessary light can be returned to the light source 10 to be reused as illumination light, so that efficiency in using light can be improved.

Figure 2B:
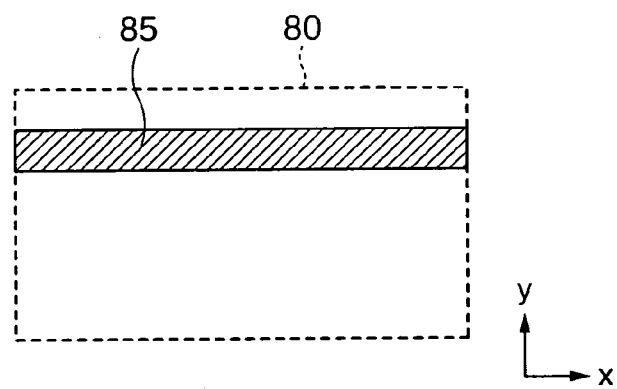

The shape of the opening 51 is formed to be same as or substantially similar to an ultimate shape of the illumination band 85, which is shown in FIG. 2B. The light flux superimposed in the illumination light flux shaping device 50 passes through the opening 51 so that an unnecessary light flux spreading in the direction of a narrow width of the rectangular lens 21a (an outer circumferential part of the first illumination band, which is perceived as a blur of an edge part) would be shielded, and thus, becomes the second illumination band having a desired shape. The shape of the opening 51 is basically assumed to be a rectangular shape, but is not necessarily limited to the above so long as the optical aberration, which is generated in a transmission process from the illumination light flux shaping device 50 to the illumination target 80, is taken into account. In this context, the opening 51 of the illumination light flux shaping device 50 is assumed to be substantially similar (in contrast with being perfectly similar) to the desired illumination band.

An optical path of the second illumination band shaped by the illumination light flux shaping device 50 is continuously changed in the y-axis direction by the optical scanning device 60 provided in the vicinity of the illumination light flux shaping device 50. Then, the second illumination band passes through a relay lens 70 and a parallelizing lens 76 to be transmitted to the optically modulating apparatus 80, which is an illumination target. The transmission process may be a magnification unchanged system or a magnification changing system in which a size of an image is changed. A parallelizing lens 24 provided before the illumination light flux shaping device 50 has a function for improving incident efficiency of illumination light on the illumination light flux shaping device 50 and optical devices provided after the illumination light flux shaping device 50 (the optically scanning device 60, for example). It is desirable but not essential to provide the parallelizing lens 24 in the above location. An incident side lens 75 may improve incident efficiency of illumination light on the relay lens 70. It is desirable but not essential to provide the incident side lens 75 in the above location.

The optically scanning device 60 consists of a rotating prism rotatable about a rotating shaft 61. The rotating prism 60 is formed from a translucent material such as glass or transparent resin, for example, which has a refractive index larger than that of the ambient atmosphere. The shape of a cross section (a yz plane in FIG. 1) orthogonal to the rotating shaft 61 is formed at least into a square pillar. Further, the rotating prism 60 is provided so that the rotating shaft 61 thereof would be parallel to the x axis in FIG. 1 and would intersect an optical axis L. Accordingly, the rotating prism 60 can move the illumination band 85 to scan, which is image-formed on the optically modulating apparatus 80, in its longitudinal direction (the y-axis direction in FIG. 1). Moreover, the rotating prism 60 is provided with a rotating unit (not shown), which controls the rotation in a direction of an arrow in FIG. 1 about the rotating shaft 61 of the rotating prism 60. A well-known technique can be used for the rotating unit. Various mechanisms and structures such that an electromagnetic motor capable of controlling rotation is directly connected to the rotating prism 60, for example, can be used. The rotating prism may be located between the relay lens 70 and the parallelizing lens 76, for example. In order to achieve precise scanning with the illumination band, however, it is desirable to provide the rotating prism 60 in the vicinity of the illumination light flux shaping device 50 or the optically modulating apparatus 80, which is the illumination target.

The optically modulating apparatus 80 consists of a liquid crystal light valve, which is a kind of a holding type of optically modulating device. In Exemplary Embodiment 1, for the liquid crystal light valve 80, an active matrix type of transmission liquid crystal cell in a TN (twisted nematic) mode is used in which a thin film transistor is used as a pixel switching device. The exemplary embodiments, however, are not limited to the above.

Next, an operation of the projector 1 in Exemplary Embodiment 1 will be described.

In FIG. 1, the light emitted from the light source 10 is divided into plural partial light fluxes by the respective rectangular lenses 21a, of the first lens array 21, to be incident on the corresponding respective transmission lenses 22a, of the second lens array 22. The incident light is then superimposed through the respective transmission lenses 22a and the superimposing lens 23 to be formed into a first narrow and long illumination band. In practice, however, the light radiated from the light source 10, which is limited in length, is not perfectly parallel. Accordingly, even when the width of the lenses 21a and 22a is narrowed in the y-axis direction so as to form a narrow and long illumination band, the rectangular lenses 21a cannot sufficiently converge light in the y-axis direction, so that the first illumination band is formed to be wider in the y-axis direction and more unclear in the edge part thereof than the illumination band having a desired shape, as shown in FIG. 11.

Figure 3A:
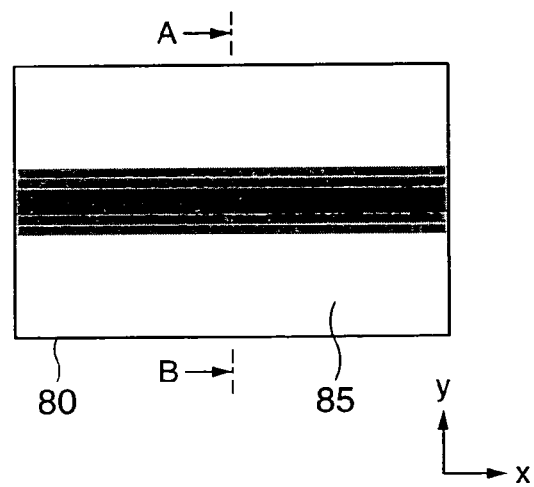
FIGS. 3A and 3B are schematics of a second illumination band in forming in an exemplary embodiment.
Figure 3B:
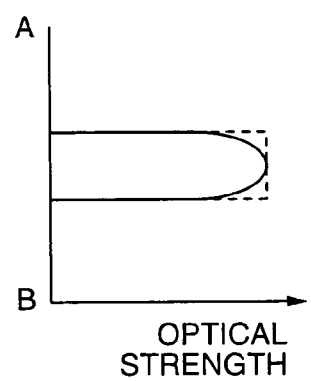

The first illumination band passes through the parallelizing lens 24 to be incident on the illumination light flux shaping device 50 provided at or in the vicinity of the superimposing location of the partial light fluxes. The illumination light flux shaping device 50 shields an outer circumferential part of the substantially superimposed light fluxes (that is, an unnecessary light flux forming an edge part widened in the y-axis direction, which is perceived to be a blur). The first illumination band is then shaped into a desired second illumination band having a clear outline as shown in FIGS. 3A and 3B. Following the above, the shaped second illumination band is incident on the rotating prism 60, which is the optically scanning device, through the incident side lens 75.

Figure 4A:
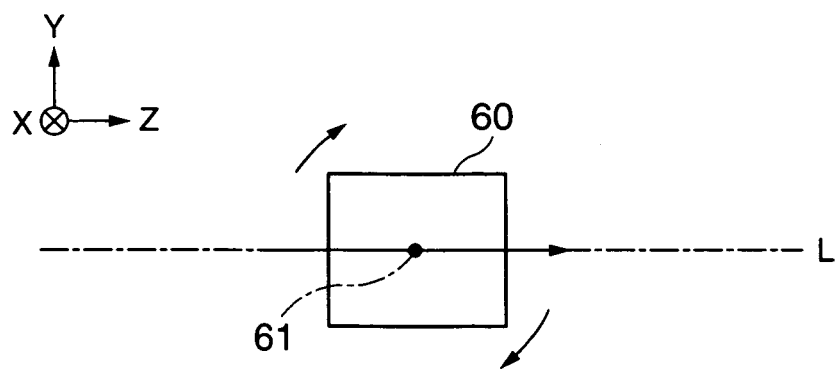
FIGS. 4A–4D are schematics of moving illumination light to scan by an optically scanning device, in an exemplary embodiment.

In the case that a phase of rotation of the rotating prism 60 is a phase in which an illumination light incident surface is vertical to the optical axis L, as shown in FIG. 4(a), the illumination light incident on the rotating prism 60 from the left side of the drawing goes straight without refraction to be emitted to the right side of the drawing. The illumination light here is expressed as a light beam parallel to the optical axis L for the purpose of easy description. Even the light not parallel to the optical axis L, however, acts also almost the same as the parallel light beam so long as an intersecting angle with the optical axis L is small. In the following description, the illumination light is also expressed as a light beam.

Figure 4B:
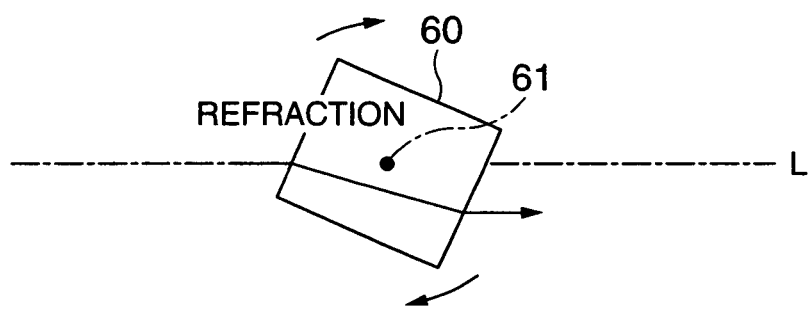
Figure 4C:
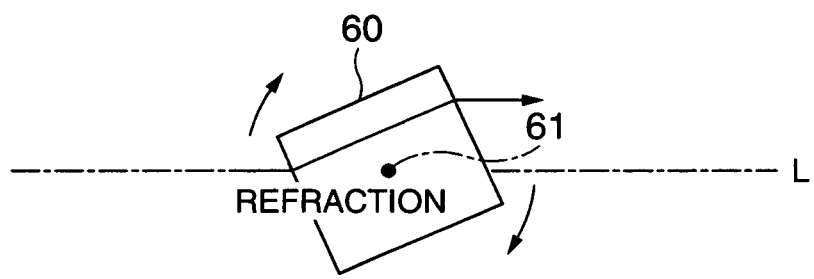
Figure 4D:
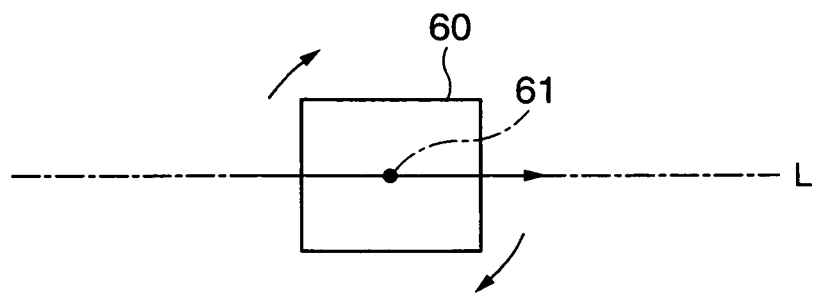

FIG. 4B illustrates a state that the rotating prism 60 is rotating within a range of 0° to 45° in a direction shown by an arrow in the drawing from a phase of rotation shown in FIG. 4A. In this case, the illumination light incident on the rotating prism 60 from the left side of the drawing is refracted on an interface between a translucent material of the rotating prism and the air. An optical path of the illumination light is thus changed so as to be substantially parallel on a lower side of the drawing to be emitted to the right side in the drawing. FIG. 4C illustrates a state that the rotating prism 60 is rotating within a range of 45° to 90° in a direction shown by an arrow in the drawing from a phase of rotation shown in FIG. 4A. In this case, the optical path is changed so as to be substantially parallel in a direction opposite to that of the case of FIG. 4B, and then, the illumination light is emitted to the right side of the drawing. FIG. 4D illustrates a state that the rotating prism 60 rotates 90° in a direction shown by an arrow in the drawing from a phase of rotation shown in FIG. 4A. In this case, similarly to the case of FIG. 4A, the illumination light incident on the rotating prism 60 from the left side of the drawing goes straight without refraction to be emitted to the right side of the drawing.

As described above, the illumination light is emitted with its optical path being substantially parallel to the optical axis L and being continuously changed in the y-axis direction in accordance with the rotation of the rotating prism 60. An amount of change of the illumination light from the optical axis L (a displacement amount in the y-axis direction) in FIG. 4 depends on a refractive index and a dimension of the translucent material forming the prism, a rotation angle of the prism, and the like.

The illumination light emitted from the rotating prism 60 is transmitted through the relay lens 70 and the parallelizing lens 76 to be image-formed on the optically modulating apparatus 80, which is the illumination target, as a narrow and long illumination band 85 having a clear outline (refer to FIGS. 3A and 3B). Rotation of the rotating prism 60 causes the illumination band 85 to be moved to scan downward from the upper part of the drawing. When the illumination band 85 reaches a lower end of the optically modulating apparatus 80, scanning is performed again from an upper end of the optical modulating apparatus 80 to the lower end. The illumination light radiated on the optically modulating apparatus 80 is modulated on the basis of an image signal inputted to the projector 1 to be projected on a screen (not shown) by a projecting lens 90.

As described above, in Exemplary Embodiment 1, the first illumination band (the first illumination light flux) in the shape of a narrow and long band is first generated by the pseudo rectangular light flux generating device 20. The illumination light flux shaping device 50 is then used to shield an unnecessary light flux spreading in the direction of a narrow width of the illumination band (an outer circumferential part of the first illumination band, which is perceived as a blur of an edge part) to finally generate a desired band-shaped second illumination band (the second illumination light flux). Accordingly, a narrow and long illumination band having a clear outline can be obtained, so that a clear display with few "blurs" can be achieved even in the case of displaying a high-speed moving picture, for example.

Further, in Exemplary Embodiment 1, the illumination light flux shaping device 50 is arranged to be provided on an incident side of the optically scanning device 60 while the second illumination band shaped by the pseudo rectangular light flux generating device 20 is moved for scanning by the optically scanning device 60. This allows the structure to be simplified, so that the device according to the exemplary embodiments can be miniaturized. That it to say, in the case that the illumination light flux shaping device 50 is provided on an emission side of the optically scanning device 60, it is required to provide a mechanism for moving the opening 51 of the illumination light flux shaping device 50 in accordance with the illumination band moved to scan by the optically scanning device 60. With the structure of Exemplary Embodiment 1, however, such a driving device is not necessary. Moreover, in the structure of Exemplary Embodiment 1, the second illumination band shaped by the illumination light flux shaping device 50 is led to the optically modulating apparatus, which is the illumination target, by the optical system after the optically scanning device 60. Accordingly, only one illumination light flux shaping device 50 is required even in the case that the projector includes plural optically modulating apparatuses.

In addition, a rotating prism is used as the optically scanning device 60 in Exemplary Embodiment 1, so that the illumination band generated by the pseudo rectangular light flux generating device 20 and the illumination light flux shaping device 50 can be radiated on the optically modulating apparatus 80 without any loss. This allows distribution of luminance to be more uniform than the case of a method of scanning reflection light by swinging a mirror left and right, such as a case of using a galvano-mirror, for example.

In Exemplary Embodiment 1, the shape of the opening 51 of the illumination light flux shaping device 50 is formed into a substantially similar shape to the shape of the illumination band finally moved to scan on the illumination target. The exemplary embodiments, however, are not necessarily limited to the above. For example, providing an optical system to convert the shape of the illumination band on the incident or emission side of the illumination light flux shaping device 50 allows the shape of the opening of the illumination light flux shaping device 50 to be formed into a shape not similar to the shape of the illumination band to be finally required. With the structure of Exemplary Embodiment 1, however, such a special optical system is unnecessary, so that the structure can be simplified.

Exemplary Modification

Next, an exemplary modification of Exemplary Embodiment 1 will be described with reference to FIGS. 5A–5C, 6A and 6B.

As described above, when an narrow and long rectangular lens is used to form a lens array type of integrator (in the case of a rod lens type, an emission end surface is formed into a narrow and long shape), the number of the rectangular lenses forming the integrator is extremely different between a direction of rows and a direction of lines in arrangement. This may cause the illumination band having uniform distribution of luminance to be difficult to obtain. In this case, even when the narrow and long illumination band is assumed to be able to be formed, un-uniform distribution of luminance of the illumination band causes a different effect of intermittent illumination for each location on a screen. This also reduces an effect in improving moving picture quality. For the purpose of improving moving picture quality, the illumination band, which is uniform in distribution of luminance thereof and which is in a rectangular shape, is the best. The illumination band, however, is moved for scanning in one direction on the illumination target. Accordingly, when the distribution of luminance is not uniform, the shape of the illumination band is desirably formed so that a product of a width of the illumination band in the scanning direction and the luminance would be uniform in a direction orthogonal with the scanning direction. In the exemplary modification, on the assumption that the illumination band has a distribution of luminance within a cross section of the light flux, the shape of the opening of the illumination light flux shaping device 50 is defined so that the luminance of the illumination band after shaping would be uniform in a direction orthogonal with the scanning direction.

Figure 5A:
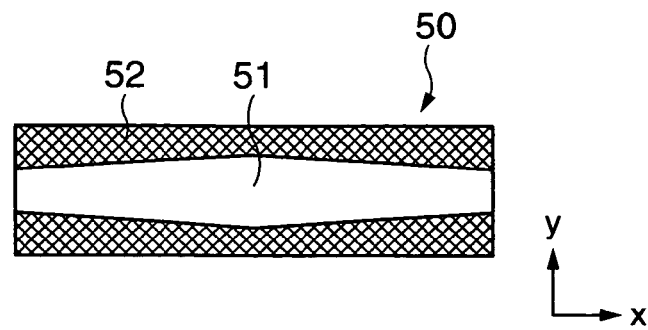
FIGS. 5A–5C are schematics of a shape and an operation of an illumination light flux shaping device in a modified exemplary embodiment.
Figure 5B:
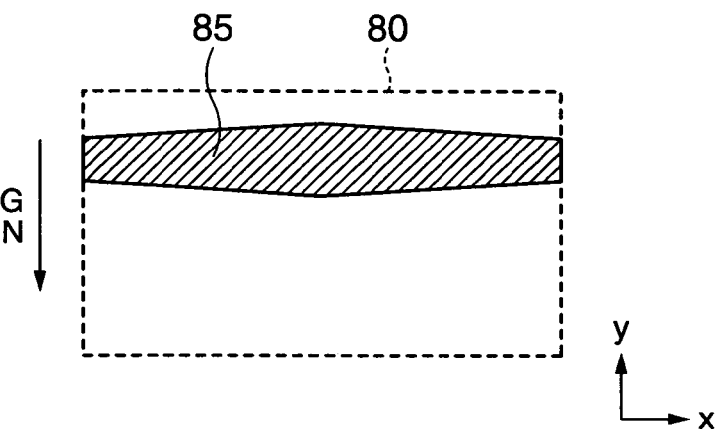

An example will be described with reference to FIGS. 5A–5C. In an illumination band shown in FIG. 5C, the luminance is lowest at a center part of the band while it becomes high toward both ends. The reference mark L1 denotes a part where the luminance is highest at an end of the band while the reference mark L2 denotes a part where the luminance is lowest at a center part of the band. In the case that such distribution of luminance exists in the illumination band, it is desirable to form the opening 51 of the illumination light flux shaping device 50 into the shape of a barrel in which the width of the center part is relatively wide and the width of the end parts is relatively narrow, as shown in FIG. 5A. It is desirable to form the opening 51 into the shape of a barrel in order to provide uniform luminance, which is time-averaged in scan-illumination, in a direction orthogonal with the scanning direction. In this case, the second illumination band 85 moved to scan on the illumination target has a barrel-shaped outer form, as shown in FIG. 5B.

Figure 5C:
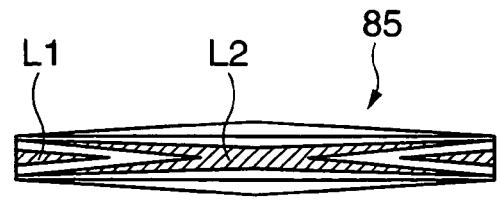
Figure 6A:
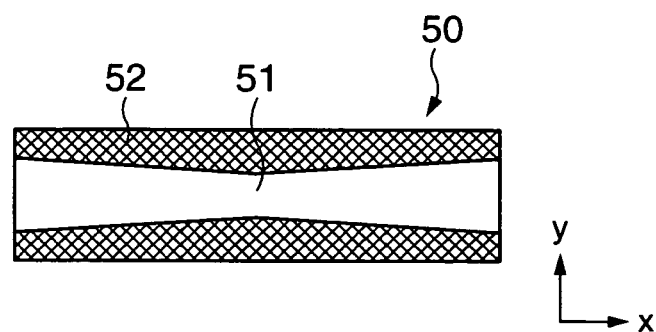
FIGS. 6A and 6B are schematics of a shape and an operation of an illumination light flux shaping device in another modified exemplary embodiment.
Figure 6B:
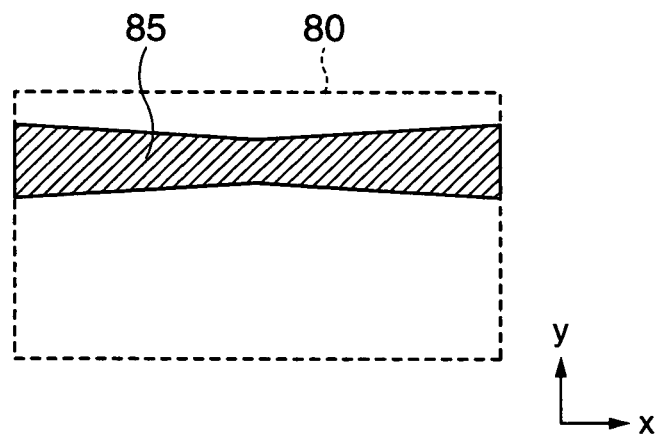

FIG. 6A shows the shape of the opening of the illumination light flux shaping device 50 in the case that the distribution of luminance is opposite to that of FIG. 5C (namely, in the case of distribution of luminance such that the luminance is highest at the center part of the band while it becomes lower toward both ends). When such distribution of luminance exists in the illumination band, it is desirable to form the opening 51 of the illumination light flux shaping device 50 into the shape of a spool in which the width of the center part is relatively narrow and the width of the end parts is relatively wide, as shown in FIG. 6A, from a viewpoint similar to the case of FIGS. 5A–5C. In this case, the second illumination band 85 moved for scanning on the illumination target has a spool-shaped outer form shown in FIG. 6B.

Even in the case of distribution of luminance other than the above, the shape of the illumination light flux shaping device 50 can be determined on the basis of the same point of view. In such a structure, a necessary condition for achieving effective intermittent illumination is that the width of the illumination band 85 does not largely change in accordance with a location in the x-axis direction in the illumination band. Accordingly, difference between the maximum band width and the minimum band width does desirably not exceed an average band width.

As described above, arranging the illumination light flux shaping device 50 to form the illumination band, which is not necessarily in a rectangular shape, allows not only design of an integrator to be easy but also efficiency in using light (transmission efficiency or superimposing efficiency) in an integrator to be improved.

Second Exemplary Embodiment

A second exemplary embodiment will be described with reference to FIGS. 7 and 8. Members and components in Exemplary Embodiment 2, which are similar to those of Exemplary Embodiment 1, are marked with the same reference numerals and signs. As such, duplicate detailed descriptions of these members and components will not be repeated.

Figure 7:
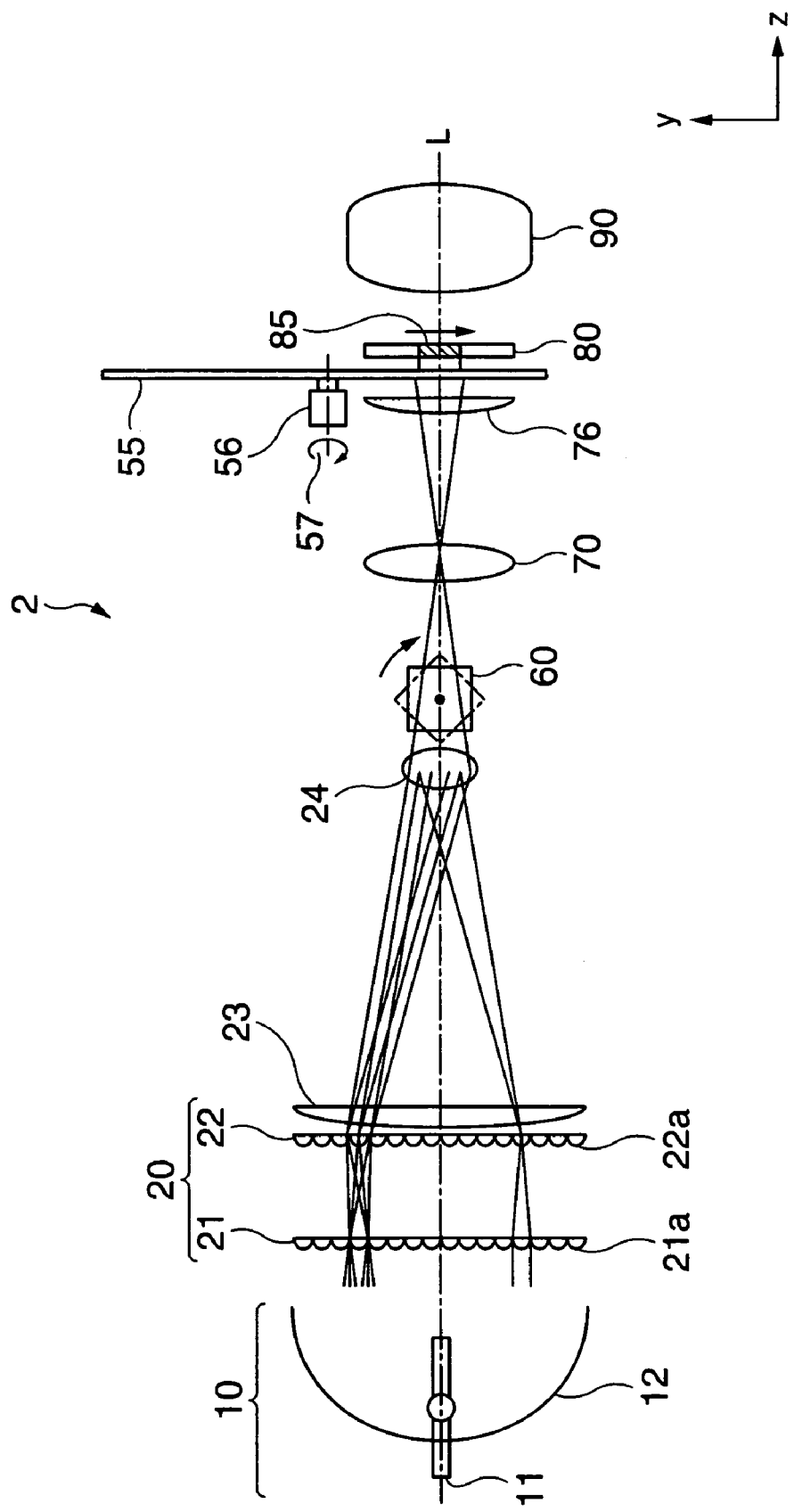
FIG. 7 is a schematic view of a projector in a second exemplary embodiment.

FIG. 7 is a schematic view of a structure of a projector in Exemplary Embodiment 2. The projector 2 includes, in its schematic structure, a light source 10, a pseudo rectangular light flux generating device 20 to generate an illumination light flux in a narrow and long band shape (an illumination band) from a light flux emitted from the light source 10, an optically scanning device 60 for moving an illumination band emitted from the pseudo rectangular light flux generating device 20 (a first illumination light flux) to scan on an illumination target (optically modulating device 80), an illumination light flux shaping device 55 to shape an illumination band emitted from the optically scanning device 60, an optically modulating apparatus 80 for modulating the shaped illumination band (a second illumination light flux) and a projecting lens (projecting device) 90 for projecting modulated light.

A basic structure of the projector 2 in Exemplary Embodiment 2 is similar to that of Exemplary Embodiment 1 except a structure and an arrangement of the illumination light flux shaping device 55. Therefore, only the illumination light flux shaping device 55 will be further described below.

Figure 8:
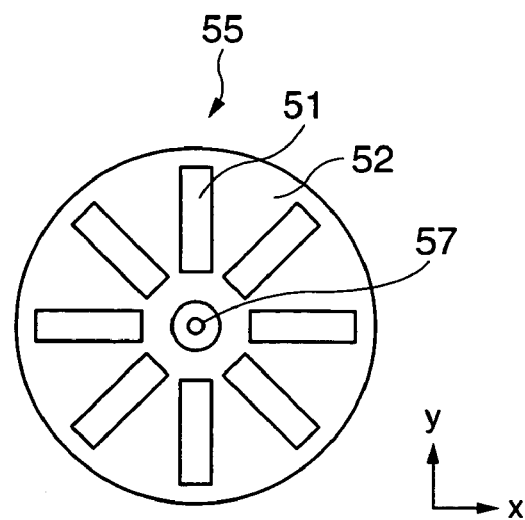
FIG. 8 is a schematic of a structure and an operation of an illumination light flux shaping device of the second exemplary embodiment.

The illumination light flux shaping device 55 is a rotating type of shielding plate including plural slit-shaped openings 51 regularly arranged around a rotating shaft 57, as shown in FIG. 8. The illumination light flux shaping device 55 is arranged to shield light incident on an area other than the openings 51 (a shielding part 52). The rotating shielding plate 55 is arranged to be rotatable by a motor 56 synchronously with scanning of the illumination band by the optically scanning device 60. The first illumination band (the first illumination light flux), which is to be moved to scan on the illumination target 80 by the optically scanning device 60 and whose cross section is wide mainly in the y-axis direction, passes through the openings 51 of the illumination light flux shaping device 55 to be shaped in cross section, and then, becomes the second illumination band (the second illumination light flux) having a desired sectional shape to reach the optically modulating apparatus 80, which is the illumination target. In the illumination light flux shaping device 55, the openings 51 rotate about the rotating shaft 57. Accordingly, the second illumination band 85 shaped by the illumination light flux shaping device 55 becomes narrower in the y-axis direction toward the rotating shaft 57 side. When a light flux having distribution of luminance, whose optical strength becomes large inversely proportionally to the width becoming narrow, is generated in advance by the pseudo rectangular light flux generating device 20 or the like, time averaging allows uniform illuminance to be obtained. Extreme difference in sectional shape of the illumination band from a rectangular shape also causes, of course, a problem in achieving effective intermittent illumination. Therefore, it is desirable that difference between a band width of a cross section of a maximum light flux and a band width of a cross section of a minimum light flux in the y-axis direction does not exceed a band width of a cross section of an average light flux.

As described above, Exemplary Embodiment 2 has a structure in which the rotating shielding plate 55, which is used as the illumination light flux shaping device, is provided on an emission side of the optically scanning device 60 to shape the first illumination band moved to scan by the optically scanning device 60, using the rotating shielding plate 55. In such a structure, a mechanism for driving the illumination light flux shaping device 55 (that is, a motor or another driving mechanism to move the openings 51 of the rotating shielding plate 55 so as to be accorded with the scanning location of the first illumination band) is required, so that the structure becomes complicated. Providing the shielding plate 55 in the vicinity of the optically modulating apparatus 80, however, allows the second illumination band having a desired shape to be certainly shaped from the first illumination band. Accordingly, a clear display with fewer "blurs" can be achieved, compared with the case of Exemplary Embodiment 1.

In Exemplary Embodiment 2, the illumination light flux shaping device 55 is a rotating type of shielding plate. It may be, however, a shielding plate in which openings thereof slide vertically and parallel in accordance with scanning by the optically scanning device 60 instead of the above. In this case, the driving mechanism becomes more complicated, but the structure is effective for improving picture quality of a moving picture image since the second illumination band in the rectangular shape can be easily achieved.

Further, the illumination light flux 55 is provided on the incident side of the optically modulating apparatus 80 in Exemplary Embodiment 2. The illumination light flux 55, however, may be provided on any one of the incident side and the emission side of the optically modulating apparatus 80. In view of reduction of heat load on the optically modulating apparatus 80, the incident side of the optically modulating apparatus 80 is more desirable.

The exemplary embodiments have been described above with reference to the attached drawings. The exemplary embodiments are not limited to the embodiments described herein. Shapes, combinations and the like of the respective components described in the above-mentioned exemplary embodiments are only examples, and various kinds of modification can be considered on the basis of requirement of design, or such, within a range not deviating from the spirit or scope of the exemplary embodiments. For example, the exemplary embodiments can be applied to an integrator optical system using a rod lens. It is possible to arrange that an illumination light flux shaping device be provided at or in the vicinity of a location where plural partial light fluxes emitted from the rod lens are superimposed so as to be transmitted and moved to scan the desirably shaped illumination band to and on an illumination target.

Moreover, in the above-mentioned exemplary embodiments, an example in which an exemplary embodiment is applied to a projecting type of display device is described. The exemplary embodiment, however, is not limited to be applied to such a projecting type of display device, but is also applicable to, for example, a direct-viewing type of display device. Furthermore, it is also possible to separate a structure from the light source 1-to the incident side of the optically modulating apparatus 80 from a structure after the optically modulating apparatus 80 so as to use the optically modulating apparatus 80 as an illumination device for illumination.

What is claimed is:

1. An illumination device to location-selectively scan and radiate an illumination light flux formed into the shape of a band on an optically modulating apparatus, the optically modulating apparatus having a holding display mode, the illumination device comprising:

a light source emitting a light flux;

a pseudo rectangular light flux generating device to generate a band-shaped illumination light flux from the light flux emitted from the light source, the band-shaped illumination light flux defining an optical path; and an optically scanning device to scan the illumination light flux emitted from the pseudo rectangular light flux generating device on the optically modulating apparatus; and an illumination light flux shaping device, disposed in the optical path, to shape the illumination light flux into a desired shape; wherein the illumination device scans and radiates synchronously with a writing operation of the optical modulating apparatus.

2. The illumination device according to claim 1, the illumination light flux shaping device including a shielding plate having a slit-shaped opening.

3. The illumination device according to claim 2, the shape of the opening of the shielding plate being substantially similar to the shape of the illumination light flux moved to scan on the optically modulating apparatus.

4. The illumination device according to claim 2, the shape of the opening of the shielding plate being a shape capable of generating an illumination light flux in which a product of a width of the illumination light flux in the scanning direction and the luminance in the light flux is substantially uniform in a direction orthogonal with the scanning direction.

5. The illumination device according to claim 2, further comprising:

a reflecting surface to reflect incident light toward a light source side formed in an area other than the opening of the shielding plate.

6. The illumination device according to claim 2, the shielding plate being provided on an incident side of the optically scanning device and the illumination light flux shaped by the shielding plate is moved to scan by the optically scanning device.

7. The illumination device according to claim 2, the shielding plate being provided on an emission side of the optically scanning device and the illumination light flux scanned by the optically scanning device being shaped by the shielding plate.

8. The illumination device according to claim 7, the shielding plate being formed from a rotating shielding plate to rotate synchronously with scanning of the illumination light flux.

9. The illumination device according to claim 1, the optically scanning device includes a rotating prism to change a location of an optical path by rotation to scan with light.

10. A display device, comprising:
the illumination device according to claim 1; and
an optically modulating apparatus having a holding type of display mode to modulate the illumination light flux emitted from the illumination device.

11. A projector, comprising:
the illumination device according to claim 1;
an optically modulating apparatus having a holding type of display mode to modulate an illumination light flux emitted from the illumination device; and
a projecting device to project light modulated by the optically modulating apparatus.

12. The illumination device according to claim 1,
the pseudo rectangular light flux generating device including a light flux dividing device dividing light flux into partial light flux, a converging optical device transmitting the partial light flux formed by the light flux dividing device, and a superimposing device superimposing the partial light flux,
the illumination light flux shaping device being provided at or in the vicinity of the superimposing location of the partial light flux.

* * * * *